Feb. 12, 1935.  G. A. LYON  1,991,326
COMBINATION TIRE COVER AND HUB CAP
Filed Sept. 9, 1932  2 Sheets-Sheet 1
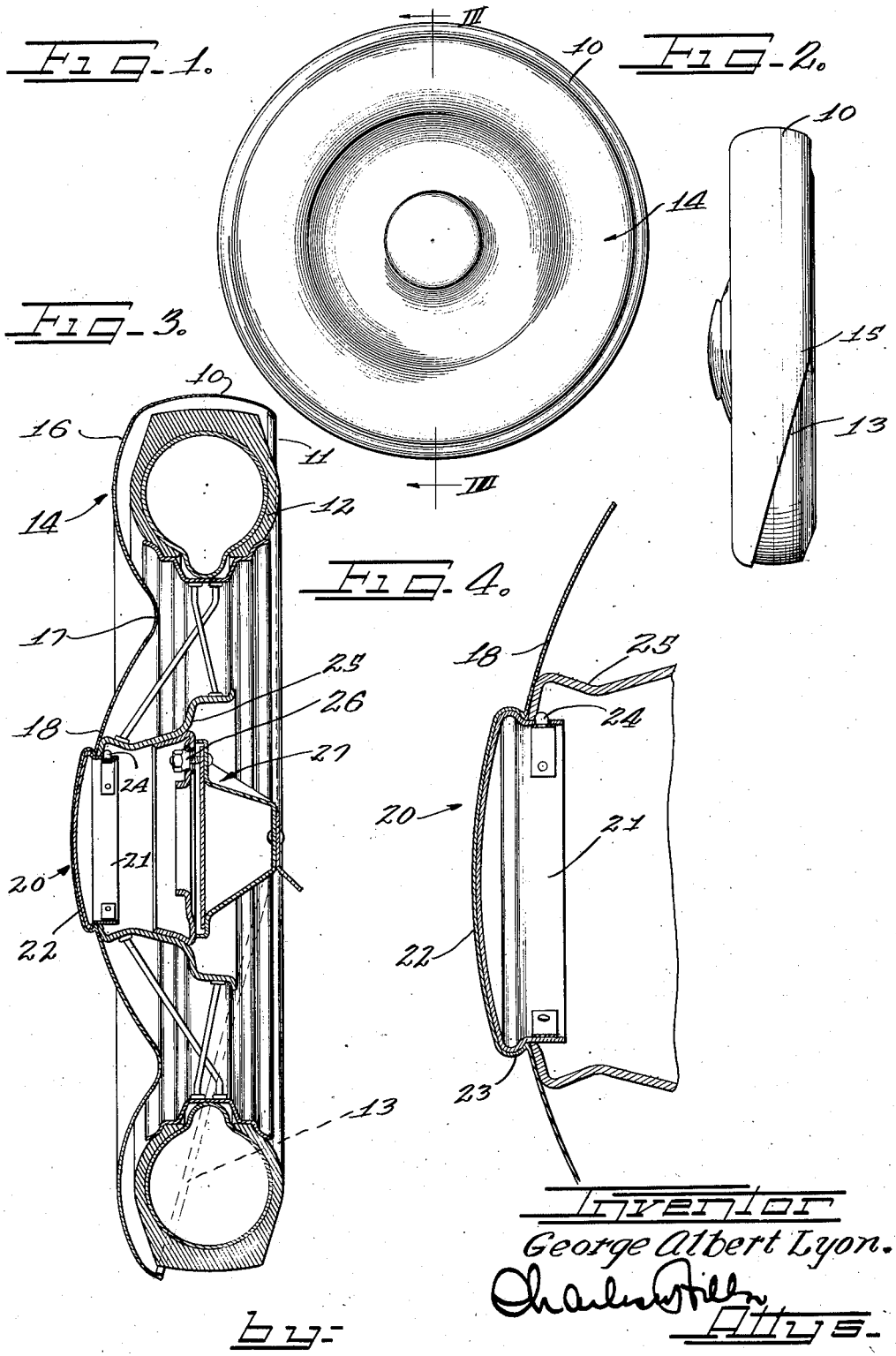
Inventor
George Albert Lyon.
by Charles Hill
Attys.

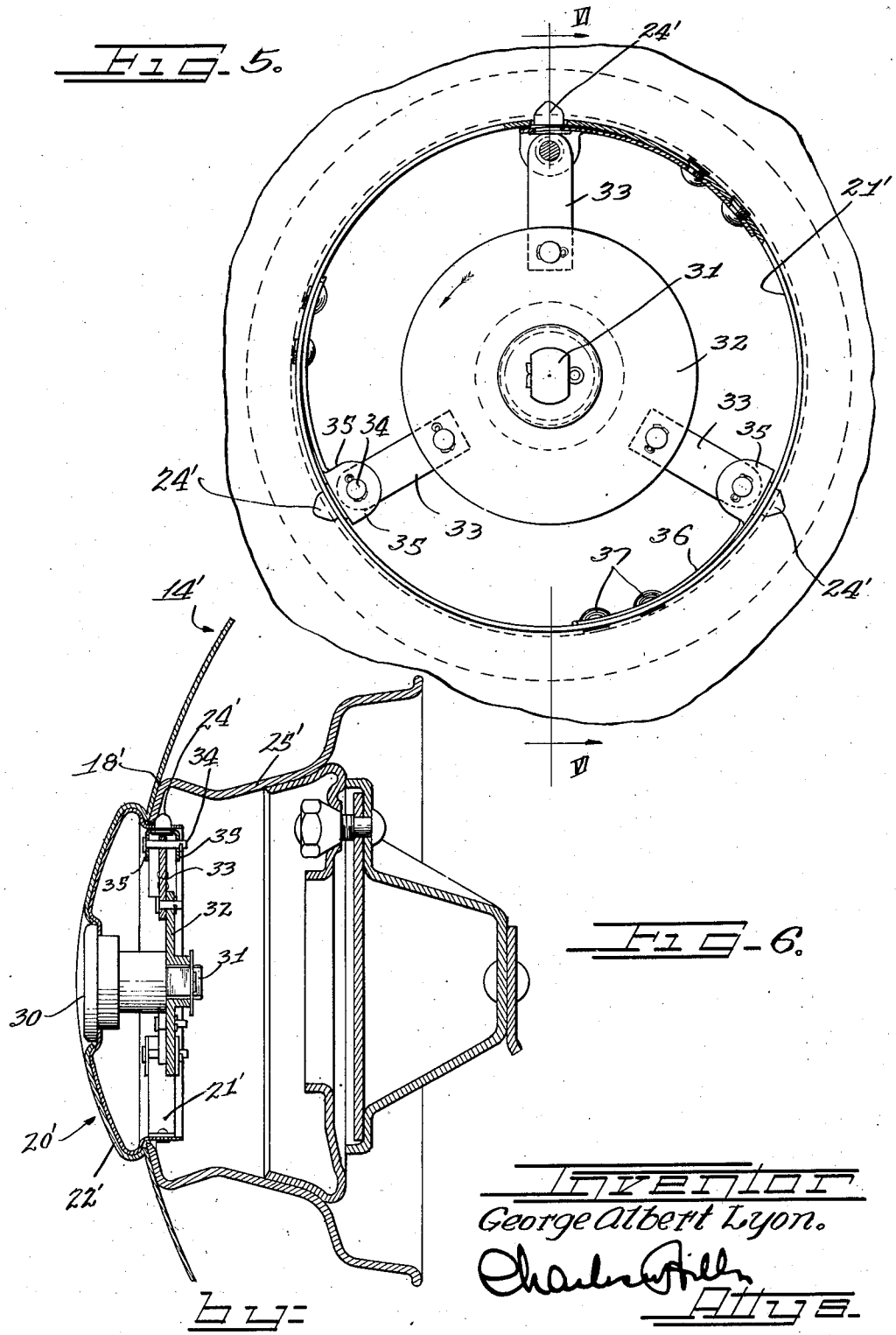

Patented Feb. 12, 1935

1,991,326

UNITED STATES PATENT OFFICE 1,991,326

COMBINATION TIRE COVER AND HUB CAP

George Albert Lyon, Asbury Park, N. J., assignor to Lyon Incorporated, Asbury Park, N. J., a corporation of Delaware Application September 9, 1932, Serial No. 632,423

18 Claims. (Cl. 150—54)

REISSUED

This invention relates to tire covers and more particularly to a combination tire cover and hub cap in which a central part of the cover is utilized as a hub cap for the spare wheel on which the cover is disposed.

It is at present the practice to provide a spare tire cover for a tire separate from the hub cap so that for every spare wheel installation two parts or devices are necessary namely the cover and hub cap in order to dress up the installation. Needless to say the use of two parts as distinguished from one is costly and involves more time in the application of the parts to the tire than would be the case if the two parts were combined in one.

Accordingly it is the object of this invention to provide a spare tire cover with a centrally disposed hub cap which is an integral part of the cover so that the single device suffices to serve the purposes of the two former parts namely the cover and separate hub cap of heretofore.

Another object of this invention is to provide an improved tire cover construction which is centralized by means of a central part formed for cooperation with the hub of the spare wheel.

Other objects and advantages of this invention will more fully appear from the following detail description taken in connection with the accompanying drawings which illustrate several embodiments thereof and in which Figure 1 is a side view of a cover embodying the features of this invention;

Figure 2 is an end elevation of the cover shown in Figure 1 and illustrating the cover as being applied to a spare tire;

Figure 3 is an enlarged sectional view taken on the line III—III of Figure 1 looking in the direction indicated by the arrows;

Figure 4 is an enlarged fragmentary detail view of the hub cap part of the cover showing the manner in which it cooperates with the hub of the spare wheel;

Figure 5 is a fragmentary detail view partly in section of a modification of the invention involving the use of centrally controlled locking means for securing the hub cap to the wheel hub whereby the hub cap and cover are both locked to the wheel hub and whereby unauthorized access to the interior of the hub for removal of the wheel from the carrier is precluded; and Figure 6 is a fragmentary sectional view taken on the line VI—VI of Figure 5 looking in the direction indicated by the arrows.

The tire cover proper illustrated in the drawings may be made of any suitable stiff sheet material such for example as hard rubber, bakelite or metallic sheet. It is however preferably made from steel sheet.

It may be fabricated in the form shown in Figures 1 to 3 inclusive by any suitable manufacturing process such for example as by spinning or rolling operations.

The unitary cover illustrated in the drawings comprises an open bottom tread covering portion 10 which has its rear marginal edge turned back upon itself to form a rolled edge which edge is advantageous in that it tends to preclude a person handling the cover from cutting his hand by the edge. This rolled edge 11 is disposed adjacent and overhangs the rear side of the tread of the tire 12. The tread covering portion 10 is substantially continuous for more than one-half the outer periphery of the tire or in other words extends around substantially more than 180° of the tire periphery. The ends of this tread covering or rim portion 10 are cut on a bias or on a diagonal as indicated at 13 and these diagonally cut ends terminate in the side cover portion 14 of the cover.

This construction of the open bottom or split rim portion 10 enables the application of the cover to the tire by the flexing of the rear marginal portion of the rim below the upper half of the cover. This flexing occurs at the upper extremities of the diagonally cut ends 13 of the rim 10 and more particularly at the end portions 15 of the rim indicated in Figure 2. Thus there is provided a cover which can not be mounted on the tire without the flexing of portions of the rear margin of the rim 10 as the rim is shoved across the tread of the tire. In other words as the spare tire cover is shoved downwardly and laterally onto the spare tire the portions of the rear margin of the cover beyond the upper half of the cover and as indicated at 15 in Figure 2 flex so as to enable the open bottom rim portion 10 to clear the tread and whereby its ends thereafter hug under the tread to pull down the major portion of the cover part on the tire.

Both the rim and side portions 10 and 14 are of curved cross section and are interiorly concave as shown in Figure 3. In general these two portions conform with the transverse curvature of the tread and outer side wall portions of the spare tire 12.

The side portion 14 has its outer margin formed into a ring of convex cross section as designated at 16 which annular ring is connected at its outermost portion to the ring 10. The inner margin of this ring 16 terminates in a circular depression 17 disposed inwardly of the tire. From this depression 17 the central portion of the cover side 14 is bulged outwardly as indicated at 18 beyond the outer side wall of the spare tire 12. The center of this outwardly bulged portion 18 is formed into a hub cap designated generally by the reference numeral 20.

In the usual hub cap structure there is employed a base made of any suitable metal such for example as brass with an outside covering of polished sheet such for example as chromium, nickel or the like.

In my present hub cap structure 20 there is employed a ring-like base which is substantially of conventional construction and which is designated by the reference numeral 21. On this base instead of using a polished outer sheet I employ the central part of the cover to serve as an outside covering for the hub cap. This central part of the cover is designated by the reference numeral 22 and is curved to conform with the outer contour of the hub cap base 21. At 23 the central part is depressed inwardly of the hub cap so as to fixedly secure it thereto.

The hub cap 21 embodies the usual spring urged elements 24 which may be three in number for engaging the inside of the outer edge of the wheel hub 25 to secure the center of the cover and the hub cap to the wheel hub.

From the foregoing detail description of the hub cap part of the cover it will be evident that what I have done is to imbed the base of the hub cap structure firmly in the center part of the cover so that it in reality becomes a part of the cover and serves to secure the central part of the cover to the hub cap by means of the yieldable retaining elements 24.

Furthermore as best shown in Figure 3 when the cover and its hub cap are in proper position on the spare wheel unauthorized access to the fastening means 26 for securing the wheel hub 25 to the carrier 27 is precluded. That is to say it is not possible to have access to this fastening means 26 for the purpose of removing the spare wheel from the carrier 27 without first removing the cover and its hub cap entirely from the wheel. It follows therefore that if the cover is locked in place by any suitable means such for example as a conventional clamping arm then access to the interior of the hub is also precluded.

The cover and hub cap may be removed from the spare tire by pressing outwardly on the side plate portion 17 from the rear side of the spare tire. For example by passing a blunt tool or object from the back side of the spare tire and into engagement with the inner surface of the portion 17 and then exerting an outward pressure on that portion the retaining elements 24 may be depressed inwardly to an extent sufficient to permit the hub cap to disengage from the hub so that the wheel and the integral hub cap may be removed as a unit from the spare wheel.

In Figures 5 and 6 I have illustrated a modification of the invention in which the hub cap 20' still comprises the hub cap base 21' and a central part 22' of the outwardly bulging portion 18' of the cover side member 14' but differing from the preferred embodiment of the invention in that the hub cap is provided with an integral and centrally disposed cylinder lock 30. This lock 30 may be of any conventional key operated type and has at its inner side a rotary member 31 adapted to be actuated by a key inserted into the lock 30 from the exterior of the cover and hub cap. Since the rotation of this member 31 by the conventional lock structure 30 is obvious and well known in the art it is thought that no detailed description of the parts of the key operated lock are necessary for a comprehensive understanding of the present disclosure. Splined to this rotary member 31 is a circular plate or disc 32 to which is pivotally secured three radial arms 33 spaced equidistantly apart.

The outer end of each of the pivotal arms 33 is pivotally mounted on a pin 34 carried by spaced arms 35 secured to the yieldable hub retaining element 24' which is carried on one end of a spring 36 fastened by rivets 37 to the hub cap body 21'.

Now it will be evident that rotation of the disc 32 in the direction of the arrow shown in Figure 5 will cause the arms 33 to pivot and move the retaining elements 24' out of engagement with the outer edge of the wheel hub 25' (Figure 6). The rotation of this disc 32 may be limited by the construction of the key operated lock 30.

Of course it follows that after the hub cap retaining elements 24' have been moved out of engagement with the outer edge of the wheel hub 25' the hub cap and cover may be removed from the spare wheel.

Now I desire it understood that although I have illustrated and described in detail the preferred embodiments of this invention, the invention is not to be thus limited but only insofar as defined by the scope and spirit of the appended claims.

I claim as my invention:

1. As an article of manufacture a spare wheel and tire cover including a side covering portion of form-retaining material for disposition over the outer side wall of a spare wheel and a hub cap connected to the center of said side portion for holding engagement with the hub of the spare wheel.

2. As an article of manufacture a spare wheel and tire cover including a side covering portion of form-retaining material for disposition over the outer side wall of a spare wheel and a hub cap connected to the center of said side portion for holding engagement with the hub of the spare wheel, said hub cap being integral with said side covering portion and being removable as a unit with the cover.

3. As an article of manufacture a spare wheel and tire cover including a side covering portion for disposition over the outer side wall of a spare wheel and a hub cap connected to the center of said side portion for cooperation with the hub of the spare wheel, said hub cap including means for securing the center of the side portion of the cover to the wheel hub.

4. As an article of manufacture a spare wheel and tire cover including a side covering portion for disposition over the outer side wall of a spare wheel and a hub cap connected to the center of said side portion for cooperation with the hub of the spare wheel, said hub cap including means for securing the center of the side portion of the cover to the wheel hub and having lock control means for releasing said hub cap securing means from engagement with the wheel hub.

5. As an article of manufacture, a cover for a tire on a spare wheel including side and rim portions for disposition over the outer side wall and tread respectively of a spare tire, said side portion being disk-like and having its central porton bulged outwardly away from the tire and provided with an integral hub cap for holding engagement with the hub of the spare wheel.

6. As an article of manufacture, a cover for a tire on a spare wheel including side and rim portions for disposition over the outer side wall and tread respectively of a spare tire, said side portion being disk-like and having its central portion bulged outwardly away from the tire and provided with an integral hub cap for holding engagement with the hub of the spare wheel, the central portion of said disk-like side constituting the outer metallic sheet covering for said hub cap.

7. As an article of manufacture, a cover for a tire on a spare wheel including side and rim portions for disposition over the outer side wall and tread respectively of a spare tire, said side portion being disk-like and having its central portion bulged outwardly away from the tire and provided with an integral hub cap for holding engagement with the hub of the spare wheel, and lock controlled means in said hub cap accessible from the exterior of said cover for locking and releasing said hub cap to and from said wheel hub.

8. As an article of manufacture, a cover for a tire on a spare wheel including side and rim portions for disposition over the outer side wall and tread respectively, of a spare tire, said side portion being disk-like and having its central portion bulged outwardly away from the tire and provided with an integral hub cap for cooperation with the hub of the spare wheel, and lock controlled means in said hub cap accessible from the exterior of said cover for locking and releasing said hub cap to and from said wheel hub including a rotatable element having extending therefrom radial arms connected at their outer ends to retaining means on said hub cap.

9. As an article of manufacture, a combination cover for a tire on a spare wheel and a hub cap for cooperation with the hub of said wheel, said hub cap being integral with the center of the cover and arranged to engage said wheel hub and center the cover on said tire.

10. As an article of manufacture, a combination cover for a tire on a spare wheel and a hub cap for cooperation with the hub of said wheel, said hub cap being integral with the center of the cover and arranged to engage said wheel hub and center the cover on said tire, means accessible from the exterior of the cover for locking the hub cap to said hub to prevent unauthorized removal of the cover and hub cap from the spare wheel.

11. In combination with a carrier and a spare wheel and tire mounted thereon, a tire and wheel cover including connecting means arranged to be interlocked with the hub of the wheel independently of the means mounting the wheel on the carrier, to thereby enable the cover to be mounted and removed without disturbing the wheel mounting means, the first means being centrally disposed relative to the cover whereby to center the same when the first means is interlocked with the wheel hub.

12. In combination with a carrier and a spare wheel and tire mounted thereon, together with releasable mounting means accessible through the hub of the wheel from the outer side of the wheel, whereby the spare wheel is detachably mounted on the carrier, a combination cover for the tire and spare wheel, and means integral with the center of the cover and arranged to engage said wheel hub and center the cover on the tire and close the hub from the outer side, and means accessible from the exterior of the cover for locking the engaging means on said hub to prevent unauthorized removal of the cover from the spare wheel and to prevent unauthorized access to said mounting means.

13. As an article of manufacture, a cover for a tire on a spare wheel, said cover including side and rim portions for disposition over the outer side wall and tread respectively of a spare tire, said side portion being disk-like and having its central portion bulged outwardly away from the tire and provided with an integral hub cap for holding engagement with the hub of the spare wheel, the central portion of said disk-like side constituting the outer metallic sheet covering for said hub cap, said covering embracing said cap and permanently securing the cap to the cover and protecting the cap.

14. As an article of manufacture, a spare wheel and tire cover including a side covering portion for disposition over the outer side wall of a spare wheel and instrumentalities connected to the center of said side portion for cooperation with the hub of the spare wheel, said instrumentalities including snap-on means for releasably securing the center of the side portion of the cover to the wheel hub.

15. As an article of manufacture, a spare wheel and tire cover including a side covering portion for disposition over the outer side wall of a spare wheel and instrumentalities connected to the center of said side portion for cooperation with the hub of the spare wheel, said instrumentalities including means for securing the center of the side portion of the cover to the wheel hub, said means being the sole means by which the cover is supported from the wheel.

16. A tire cover including a side disc-like portion to cover a side wall of the tire and the adjacent side of a spare wheel on which the tire is mounted, said side portion having a central socket constricted at its mouth, means formed to be mounted on the hub of the spare wheel and having a head disposed in said socket and being reduced to pass through the constriction whereby said means is permanently mounted on said cover and, when said means is mounted on the wheel hub, the cover is centered and mounted in proper tire protecting position.

17. In a spare wheel and cover assembly including a wheel having a central hub and being secured to a supporting member internally of said hub, a spare tire and wheel cover having a side portion provided with a central opening, a hub cap disposed in said opening and means for locking said hub cap against removal from the wheel and hub assembly to prevent unauthorized access to the part of the wheel secured internally of said hub to the supporting member.

18. In a spare wheel and cover assembly including a wheel having a central hub and being secured to a supporting member internally of said hub, a spare tire and wheel cover having a side portion provided with a central opening, a hub cap disposed in said opening and means for locking said hub cap against removal from the wheel and hub assembly to prevent unauthorized access to the part of the wheel secured internally of said hub to the supporting member, said side portion of the cover being secured to said wheel internally of said wheel hub.

GEORGE ALBERT LYON.